(No Model.)

A. JOHNSTON, J. MALLETTE, & C. WOOD.
Belt Fastener.

No. 231,808. Patented Aug. 31, 1880.

Witnesses
Nat. E. Oliphant
Geo. B. Porter

Inventors
Abner Johnston,
James Mallette,
Charles Wood,
per Chas. H. Fowler,
Attorney

UNITED STATES PATENT OFFICE.

ABNER JOHNSTON, JAMES MALLETTE, AND CHARLES WOOD, OF SIDNEY PLAINS, NEW YORK.

BELT-FASTENER.

SPECIFICATION forming part of Letters Patent No. 231,808, dated August 31, 1880.

Application filed July 12, 1880. (No model.)

*To all whom it may concern:*

Be it known that we, ABNER JOHNSTON, JAMES MALLETTE, and CHARLES WOOD, citizens of the United States, residing at Sidney Plains, in the county of Delaware and State of New York, have invented certain new and useful Improvements in Belt-Fasteners; and we do hereby declare that the following is a full, clear, and exact description of the same, reference being had to the annexed drawings, making a part of this specification, and to the letters and figures of reference marked thereon.

Figure 1:
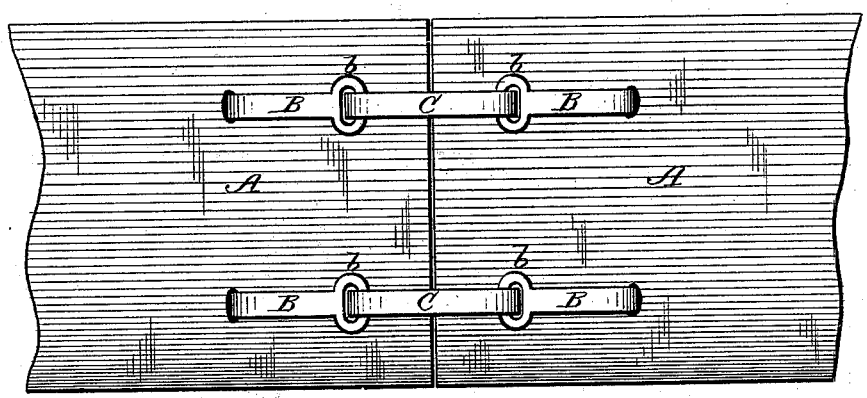
Figure 2:
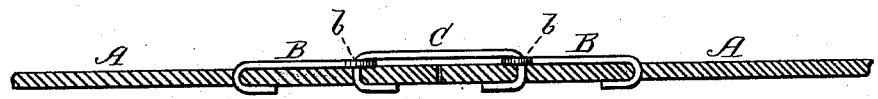
Figure 3:
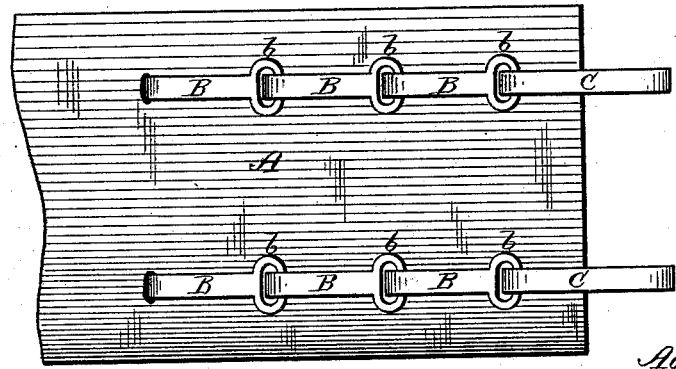

Figure 1 of the drawings is a top-plan view of our invention, showing it applied to the ends of a belt for connecting them together. Fig. 2 is a side elevation of the same with the belt in section; and Fig. 3 is a plan view, showing the application of the fastening to old or worn-out belts for the purpose of strengthening the ends thereof.

The present invention has relation to certain new and useful improvements in sheet-metal fastenings for uniting the ends of leather belts, which possess strength and durability, as well as cheapness in their manufacture, and which may be applied to old or worn-out belts to strengthen and more firmly unite the ends together.

The invention consists in the peculiar construction of the fastening, as illustrated in the drawings, and hereinafter described.

In the accompanying drawings, A A represent the ends of a leather belt of the ordinary construction connected together by our improved fastening.

The fastening consists of two sheet-metal plates, B B, formed at one end with eyes $b$, to receive the ends of a coupling, C, also formed of sheet metal.

In the application of the fastening the ends of the plates B B are passed through openings near the ends of the belt and bent down against the under side of the same, after which the ends of the belt are brought in contact therewith. The ends of the coupling C are bent down at right angles and passed through the eyes $b$ of the plates B B, and also through holes or slits in the belt, after which they are bent down against the under side of the same. The ends of the coupling C not only pass through the eyes $b$, but also through the belt, which prevents too great a strain on the plates B B, and makes a stronger fastening.

In case of old or worn-out belts a series of the metal plates B may be employed and connected together, as illustrated in Fig. 3, to run back as far as desirable, so as to strengthen the belt at the ends, the last one of the series of plates upon each end of the belt being connected, as usual, by the coupling C.

The fastening will be found very durable and readily applied, and as the ends of the coupling C, as well as the plates B, pass through the belt, the latter is given increased strength and durability, and will offer no obstruction to the running of the belt over pulleys or drums.

Having now fully described our invention, what we claim as new, and desire to secure by Letters Patent, is—

A belt-fastening consisting of the plates B B, having eyes $b$, and adapted to be connected to the belt as set forth, in combination with the coupling C, the ends thereof adapted to pass through the eyes $b$ and through the belt, and to be bent down against the under side of the same, substantially as and for the purpose specified.

In testimony that we claim the above we have hereunto subscribed our names in the presence of two witnesses.

ABNER JOHNSTON.
JAMES MALLETTE.
CHARLES WOOD.

Witnesses:
TRUMAN LEWIS,
THOMAS DORAN.